United States Patent

Garlaschelli et al.

[11] Patent Number: 5,904,197
[45] Date of Patent: May 18, 1999

[54] RADIAL TIRE FOR MOTOR VEHICLES WITH A BELT STRUCTURE INCLUDING SIDE STRAPS

[75] Inventors: Carlo Garlaschelli, Monza; Gaetano Lo Presti, Sesto San Giovanni, both of Italy

[73] Assignee: Pirelli Coordinamento Pneumatici S.P.A., Milan, Italy

[21] Appl. No.: 08/785,671

[22] Filed: Jan. 17, 1997

[30] Foreign Application Priority Data

Jan. 19, 1996 [IT] Italy .................................. MI96A0082

[51] Int. Cl.⁶ ................................. B60C 9/18; B60C 9/22
[52] U.S. Cl. ......................... 152/531; 152/526; 152/532; 152/533
[58] Field of Search ..................... 152/531, 533, 152/532, 526, 538

[56] References Cited

U.S. PATENT DOCUMENTS

| 4,696,335 | 9/1987 | Tsukagoshi et al. . |
| 5,435,369 | 7/1995 | Yap et al. . |
| 5,662,752 | 9/1997 | Nakano ................................. 152/531 |

FOREIGN PATENT DOCUMENTS

| 192910 | 9/1986 | European Pat. Off. . |
| 0572906 | 12/1993 | European Pat. Off. ............... 152/531 |
| 572906 | 12/1993 | European Pat. Off. . |
| 2644452 | 4/1977 | Germany . |
| 2061202 | 5/1981 | United Kingdom . |
| 2276358 | 9/1994 | United Kingdom . |

*Primary Examiner*—Adrienne C. Johnstone
*Attorney, Agent, or Firm*—Stevens, Davis, Miller & Mosher, L.L.P.

[57] ABSTRACT

A tire for motor vehicles includes a belt structure (3) which has consecutively overlapped first and second belt strips (5, 6) and a pair of side straps (7) overlying the second belt strip (6) adjacent to the side edges (6a) of the second belt strip. Each side strip (7) is made up of at least one cord circumferentially wound in a plurality of coils to form two radially superposed layers of coils disposed in axial side by side relation. The first belt strip (5), located adjacent to the carcass structure (2), substantially has the same width as the tread band (4), and laterally projects from the second belt strip (6) radially overlapped therewith. The second belt strip (6) has side flaps (6b) projecting from the side straps (7) and spaced apart from the first belt strip (5) by a spacing which progressively grows with distance away from the outer edges (7a) of the side straps themselves. These side straps axially project inwardly with respect to the position corresponding to the groove bottom of the axially outermost circumferential groove.

9 Claims, 1 Drawing Sheet

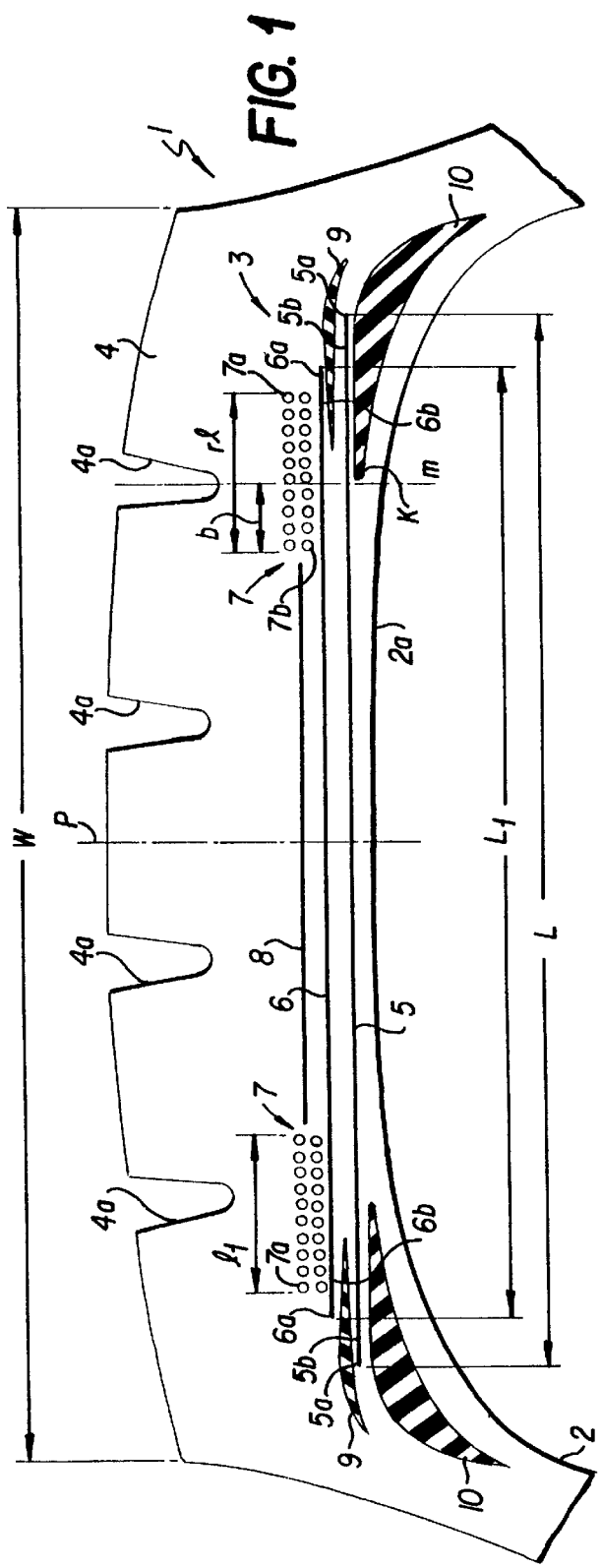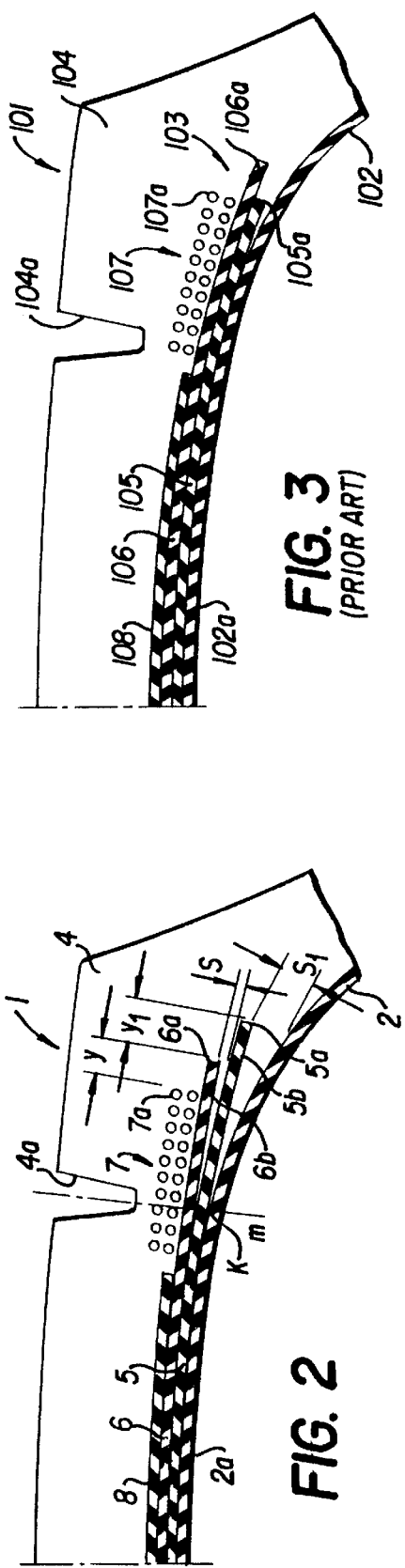

RADIAL TIRE FOR MOTOR VEHICLES WITH A BELT STRUCTURE INCLUDING SIDE STRAPS

FIELD OF THE INVENTION

The present invention relates to a radial tire for motor vehicles with an improved belt structure. The present invention is especially useful for heavy duty tires.

BACKGROUND OF THE INVENTION

It is known that research and studies developed in the tire-planning field have aimed at simultaneously achieving many qualitative features, such as (only mentioning some of them selected from those of the greatest importance) roadholding, steering property, rolling resistance, comfort, high kilometric yield and good wear evenness and, above all in tires for motor-buses, trucks and transport vehicles in general, resistance to fatigue under heavy operating conditions, characterized by high vertical and transverse loads and high environmental temperatures.

The Applicant has already achieved a good compromise solution between said features, by a tire described in the Italian Patent No. 1125578 to which reference is herein made as the most pertinent state of the art. This radial tire has a usual carcass structure composed of cords extending in radial planes containing the rotation axis of the tire, to which a belt structure is applied which preferably comprises first and second radially superposed belt strips and a pair of side straps circumferentially applied to the opposite side edges of the radially external belt strip. Said belt strips are formed of metallic cords parallel to each other in each strip and oriented obliquely in respectively opposite directions with reference to the equatorial plane of the tire, and they have widths slightly differentiated from each other according to a given scaled down or consecutively staggered pattern.

In turn, the side straps are formed of a plurality of metallic cord coils (a continuous winding or several distinct coils) circumferentially disposed, so as to define two radially superposed layers of coils placed in axial side by side relation and oriented parallel to the equatorial plane of the tire.

One of the fundamental roles of the side straps is that of conveniently "belting" or confining the underlying belt strips at the edges of the strips themselves, which are the most critical areas with reference to the resistance to fatigue of the belt structure and therefore the tire as a whole. In fact, at such areas the ends of the individual metallic cords forming the belt strips have more freedom of movement than at the intermediate portions of the longitudinal extension of the cords themselves, that is at the central area of the tire crown portion.

This greater freedom of movement in the tires devoid of said straps or other confining elements results in great stresses applied to the ends of the belt structure and involving deformations, especially shearing stresses that will trigger tearings in the rubberizing blend and separation of the belt from the carcass ply and also between the strips of the belt structure.

For the purpose of obviating all the above drawbacks, at the present time positioning of the side straps is selected as much as possible close to the side edges of the belt structure, in an attempt to localize the confining action as much as possible in the vicinity of the edges. As it is not technically possible to make the external side edges of the straps coincide with the edges of the underlying belt strip, neither is it obviously possible to make them project therefrom. The technical solution hitherto adopted for achieving the above purpose has been that of giving the belt strips a consecutively scaled down or staggered pattern, so that the second strip is larger than the first strip placed adjacent to the carcass. Under this situation, the external edges of the side straps can be positioned a short distance away from the edges of the second belt strip so that they substantially correspond with the side edges of the first belt strip, thereby ensuring the necessary confining action on the belt strip edges.

Mainly for the above reason, the possibility of using an inversely staggered pattern, that is with the larger belt strip at a radially internal position, was unthinkable in heavy duty tires of the below described type. This is because it could be proved from experience that, in operation, the residual width of the unconfined edges of the belt structure was sufficient to trigger early and unacceptable separations of the belt structure members from each other and from the carcass, resulting in the tire becoming unusable.

SUMMARY OF THE INVENTION

The radial tire of the present invention comprises a carcass structure provided with at least one carcass ply having reinforcing cords oriented substantially in radial planes containing the rotation axis of the tire, a tread band extending circumferentially around the carcass structure, a belt structure circumferentially interposed between the carcass structure and the tread band and comprising a pair of radially superposed belt strips extending axially substantially as much as the tread band, of which the first belt strip faces the carcass structure and has a plurality of cords oriented obliquely to the equatorial plane of the tire, whereas the second belt strip extends circumferentially around the first belt strip and has cords oriented obliquely to the equatorial plane in a direction opposite to the orientation of the cords in the first belt strip.

This belt structure is further provided with a pair of side straps each of which is disposed adjacent to a respective side edge of the second belt strip and comprises a plurality of cord coils circumferentially wound on the second belt strip in two radially superposed layers formed of several coils disposed in axial side by side relation. The present description the invention will particularly refer to heavy duty tires, that is tires for transportation of goods and persons, although the innovative concepts therein proposed can also be advantageously employed in the manufacture of tires for cars.

With respect to the present disclosure, heavy duty tires include those in which the fitting diameter has a value included between 17.5" and 24.5", and preferably not exceeding 22.5".

BRIEF DESCRIPTION OF THE DRAWINGS

FIG. 1 is a diagrammatic cross-sectional view of a tire made in accordance with the present invention;

FIG. 2 is a partial sectional view showing the mutual arrangement of the components of the belt structure in a tire in accordance with the invention, in a more detailed manner; and FIG. 3 is a partial sectional view having an orientation similar to that in FIG. 2 of a tire made in accordance with the known art.

DETAILED DESCRIPTION OF THE PREFERRED EMBODIMENTS

In accordance with the present invention, it has been found that by reversing the usual consecutively staggered pattern, in combination with the modalities to be described in the following, it is possible to achieve a great number of unexpected advantages over the known art, without penalizing the operational features and performance typical of the tires of the above specified type.

In one aspect, the invention relates therefore to a tire for motor vehicles with an improved belt structure, characterized in that the first belt strip, adjacent to the carcass ply, has a larger width than the second belt strip, which width preferably does not exceed 95% of the tread width.

In more detail, the second belt strip has side flaps projecting from the side straps and spaced apart from the first belt strip in a progressively increasing manner away from the external side edge of the adjacent side strap, with edges separated from the first belt strip by an upper gap providing a spacing preferably in a range between 0.5 and 10 mm. Preferably, at each point of the extension of each side flap of the second belt strip the spacing of the upper gap is proportional to the axial distance between the point and the side edge of the adjacent side strap, more preferably according to a mathematic relation of the parabolic type.

According to a preferred embodiment, provision is made for at least one pair of first elastomeric inserts each extending circumferentially between the first belt strip and the second belt strip close to the side flaps, for determining the upper-gap spacing.

Advantageously, the first belt strip has side flaps projecting from the second belt strip, separated from the carcass ply in a manner increasingly growing away from the adjacent edge of the second belt strip, with their edges each spaced apart from the carcass ply according to a lower gap providing a spacing preferably in the range between 2 mm and 15 mm.

In a preferred embodiment, the tire further comprises second elastomeric inserts each extending between one of the side flaps of the first belt strip and the carcass ply.

In a second aspect the invention relates to a tire for motor vehicles with an improved belt structure, characterized in that the axially inner edges of the side straps project axially inwardly relative to the axially inner end of the lower gap.

Further features and advantages will become more apparent from the following detailed description of a preferred non-exclusive embodiment of a tire for motor vehicles with an improved belt structure according to the present invention. This description is taken hereinafter by way of non-limiting example, with reference to the accompanying figures.

With reference to FIGS. 1 and 2, generally identified by 1 is a tire for motor vehicles with an improved belt structure in accordance with the present invention.

The tire 1, in particular in the embodiment adapted for size 315/80 R 22.5", in a manner known per se comprises a carcass structure 2 having one or more carcass plies 2a each consisting of cords (not shown) disposed consecutively in side by side relation and in substantially radial planes containing the rotation axis of the tire.

Circumferentially applied to the carcass structure 2, at a centered position with respect to the equatorial plane of the tire identified by a dashed line "p", is a belt structure generally denoted by 3. Belt structure 3 is in turn surrounded by a tread band 4 provided, at the external rolling surface thereof, with a raised tread pattern comprising a plurality of hollows variously disposed with respect to the equatorial plane, in particular, according to convenience, circumferential grooves 4a, and optional transverse cuts (these latter not shown).

The belt structure 3 comprises at least one belt strip 5 adjacent to the carcass 2, a second belt strip 6 applied to the first strip 5 so that it is overlapped therewith, and a pair of side reinforcing straps 7 disposed symmetrically to the equatorial plane "p" and each extending adjacent to the corresponding edge 6a of the second belt strip 6.

The first and second belt strips 5, 6 are essentially formed of metallic cords having an ultimate elongation in the order of 3%, disposed mutually in side by side relation and oriented obliquely to the equatorial plane "p", preferably at an angle included between 10° and 30°, the cords forming the second strip 6 being inclined in the opposite direction as compared with those of the first strip 5.

The side straps 7 are in turn made up of one or more cords or one or more cord bands circumferentially wound in several turns around the belt strips 5, 6 so as to form at least two radially superposed layers of coils disposed axially in side by side relation. Each side strap 7 preferably has a width "l" which is typically 15%, and generally in a range between 5% and 40%, most preferably between 10% and 25%, of the maximum width "L" of the belt structure 3.

In a manner also known per se, in order to promote the circumferential expansion of the belt structure 3 during the tire molding steps, the selected cord or cords for the manufacture of the side straps 7 are of the so-called "HE type" (high elongation type), characterized by a special behavior in traction and an ultimate elongation included between 4% and 8%.

In addition, the belt structure 3 can be provided with other strips at the central portion of the structure and at a radially internal and/or external position relative to the strips 5 and 6. In particular, the belt structure 3 can be provided with an auxiliary strip 8, formed of reinforcing cords inclined to the circumferential direction, preferably at an angle included between 10° and 70°, and extending between the side straps 7, according to specific requirements as demanded by the particular type of use of the tire.

For the sake of clarity, in FIG. 1 the belt strips 5, 6 of the carcass 2a and the auxiliary strip 8 are identified by a solid line and the distance between the strips has been deliberately exaggerated as compared with the real situation.

All that being stated, the belt strips 5, 6 do not exactly have the same width, but the corresponding edges are suitably offset with respect to each other and the outer side edge of the respective strap so that the stiffness of the belt along the axial extension of the belt itself may gradually change in a convenient manner.

In accordance with the present invention, the consecutive staggering is such that the first belt strip 5 adjacent to the carcass ply 2a has a width L greater than the width $L_1$ of the second belt strip 6 radially superposed therewith. The width L of the first belt strip 5 which also represents the maximum width of the whole belt structure 3, is equal to, or more conveniently, as large as at most 95% of the maximum width W of the tread band.

In a manner commonly known to those skilled in the art, when the width W cannot be immediately measured due to rounding off of the shoulder profile, this width is drawn from the pattern of the corresponding vulcanization mold between the intersection points of the extensions of the tread and buttress profiles.

The side straps 7 are in turn located with the respective outer side edges 7a slightly spaced apart from the side edges 6a of the second belt strip 6 radially below. In other words, the second belt strip 6 has side flaps 6b projecting from the side straps 7, whereas the first belt strip 5 has in turn respective side flaps 5b projecting from the second belt strip 6.

Still in accordance with the present invention, associated with the belt structure 3 is at least one pair of first elastomeric inserts 9 (not shown in FIGS. 2 and 3) each extending circumferentially between the first and second belt strips 5 and 6, close to the side flaps 5b, 6b thereof.

The presence of the first elastomeric inserts 9 which, when vulcanization has been completed, form a unitary piece with the blend of the tread band and the other elastomeric parts of the tire 1, causes the side flaps 6b of the second belt strip 6 to be spaced apart from the first belt strip 5 by a spacing, hereinafter referred to as "upper gap", (FIG. 2). Preferably, the spacing grows with distance away from the outer side edge 7a of the adjacent side strap 7. More preferably, at the edge 6a of the flap 6b of the second belt strip 6, the spacing "S" of the upper gap should be proportional to the axial distance "y" existing between the edge 6a and the side edge 7a of the adjacent side strap 7. Most preferably, the upper gap "S" spacing (in units of mm) is correlated with the value of the axial distance "y" (in units of mm) according to the following relation:

$$S = y^2 r + k$$

wherein k, preferably equal to 0.5 mm, represents the minimum distance between the cords of the two belt strips, and r is a positive nonzero number up to and including 0.1, preferably equal to 0.03.

In a preferred embodiment the maximum axial distance "y" existing between the side edges 7a, 6a of each side strap 7 and the second belt strip 6 is in the range between 1 and 30 mm, and most preferably between 5 and 7.5 mm, whereas the value of the consequent upper gap "S" spacing is in a range between 0.5 and 10 mm.

In turn, the first belt strip 5 has the respective side flaps 5b projecting from the second belt strip 6, preferably according to a maximum axial distance "$y_1$" included between 5 mm and 20 mm. Moreover, the flaps are spaced apart from the carcass ply 2a preferably in an increasing manner away from the adjacent side edge 6a of the second belt strip 6. Most preferably, the distance "$S_1$" between the edge of the first belt strip 5 and the carcass ply 2a, hereinafter referred to as "lower gap", is in a range between 2 mm and 15 mm.

In the spaces defined between the carcass ply 2a and the first belt strip 5, close to the side flaps 5b of said strip 5, second elastomeric inserts 10 can be advantageously interposed for governing said lower gap.

Due to the consecutively staggered pattern in accordance with the invention and the consequent axial backing of the straps inwardly of the tire with respect to the known solutions of the prior art, the straps now extend on either side of the plane (m) passing through the center line (at the groove bottom) of the axially outermost longitudinal groove 4a of the tread pattern. Preferably the inner side edges 7b of the straps 7 axially project to the inside with respect to the axially inner leading end (K) of the lower gap, over a portion b (FIG. 1) generally in the range between 0% and 30%, and most preferably between 0% and 15%, of the maximum axial extension L of the belt 3. Typically, portion b has a length equal to 8% of the maximum axial extension L of the belt 3.

The present invention achieves many unexpected advantages as compared with the known art, as will be better clarified with the aid of FIGS. 2 and 3 respectively referring to the mutual positioning of the components of the belt structures made according to the present invention and the known art, respectively.

With reference to FIG. 3, the tire parts corresponding to those in accordance with the invention are identified by the same reference numerals increased by 100.

In the known art, the groove between the belt strips 105, 106 had to be selected in such a manner that the second belt strip 106, that is the belt strip at the radially outermost position, was larger than the first belt strip 105 located adjacent to the carcass ply 102a. This solution was required because it was necessary to simultaneously have: a belt structure substantially as large as the tread for the purpose of supporting the tread end portions, that is the surface of the shoulder ribs each delimited between the buttress edge and the axially outermost groove, in order to ensure a high kilometric yield and good wear evenness; side straps 107 in which the outer edges 107a are located as close as possible to the side edges 105a, 106a of the belt strips 105, 106, for conveniently confining the belt structure, thereby limiting the freedom of movement of the cord ends in the projecting flaps of the belt strips as much as possible; side straps supported by a band of crossed cords having at least matching edges but preferably projecting edges with respect to the strap edges; and finally the flap or flaps of the belt strips projecting from the strap edges, sufficiently spaced apart from the carcass ply to prevent possible tearings or separations of the belt ends from extending to the carcass structure.

As FIG. 3 shows, the outer edges 107a of the straps 107 substantially correspond with the side edges 105a of the first belt strip 105, in turn terminating very close to the carcass ply 102a, so that the second belt strip 106 completely bears the straps 107. Also, the side edges 106b of the belt strip 106 project a very short amount with respect to the straps, although they have the corresponding edges 106a sufficiently spaced apart from the carcass ply 105.

The side edges 5a, 6a of the belt strips 5 and 6 represent very critical areas with reference to the stresses induced in the belt structure 3 following the cyclic deformations to which the tire is inevitably subjected on rolling. In these areas the ends of the cords forming the belt strips 5, 6 have a much higher freedom of movement than at the intermediate points of the cord extensions. This freedom of movement has a tendency to cause localized stresses, which become greater as the volume of the elastomeric material disposed around said edges 5a, 6a becomes smaller.

It is apparent that due to this necessity, adoption of an inversely consecutive staggering in which widening of the belt strips or backing of the straps was required, would have in both cases involved worsening the resistance to fatigue of the belt especially at high speed, and triggering uneven wearings on the side portions of the tread and in particular on the edges of the axially external circumferential grooves.

In contrast, in the belt structure made according to the present invention the belt strip having the largest width "L" is the first belt strip 5 located adjacent to the carcass ply 2a. In this embodiment the adopted consecutive staggering imposes moving back the strap edge and the overall width of the new belt structure is the same as that of the known belt structure or even smaller. Thus, the side edges 5a of the first ply 5 can be disposed at a much greater distance from the adjacent carcass ply 2a than is allowed in the known art.

Spacing apart of the side edges 5a of the first belt strip 5 with respect to the carcass ply 2a offers a further important advantage in terms of reliability and safety of use of the tire. It has already been said that these edges represent, as known, the most stressed area of the whole belt structure and therefore, the area from which possible structure yieldings of the tire begin. In the present state of the art, since the edges 105a of the first ply 105 are immediately close to the carcass ply 102a, possible breaking in the belt strip edges could extend to the carcass and reach the corresponding plies 102a. In the present invention, in contrast, possible breaking would extend in the direction of the tire sidewall, thereby safeguarding the integrity of the carcass reinforcing structure consisting of plies 2a.

It should be also noted that in the known embodiment the edge 105 was much more stressed as compared with what happens in the present invention, in that it was located at an area in which, as known, stresses acting on the carcass structure are transmitted to the belt structure.

Staggering according to the invention offers the possibility of interposing elastomeric inserts 9 between the flaps 5b, 6b of the belt strips 5 and 6 and in addition enables the thickness of the elastomeric inserts 10 between the flaps 5b of the strip 5 and the carcass ply 2a to be increased. This situation gives rise to an important advantage of the invention, that is an important decisive increase in the structural strength of the tire under heavy operating conditions.

In the tire of the present invention, the high amount of elastomer material interposed between the edges 5a, 6a of the belt strips 5, 6 and between the flaps 5b of the first ply 5 and the carcass ply 2a, elastically takes up the deformations induced by the movements of the cord ends. This brings about an important improvement in the resistance to fatigue of the belt strip ends under working conditions of the tire.

It should be also noted that this possibility of interposing the elastomeric inserts, and the resulting important advantage thus achieved, was explicitly obtained by the structure of the invention. In fact, in the known art, as shown in FIG. 3, positioning of the side straps 107 in alignment with the edges 105a of the first belt strip would make practically useless, and very difficult too, the interposition of the present inserts between the belt strips, in that the strong confining action performed by the side straps 107 cause the ejection of most of the elastomeric material forming the insert themselves during the tire molding step.

The consecutively staggered pattern proposed in accordance with the present invention makes the stiffness variation within the tire, at the end areas of the belt structure 3, much more gradual than in the known art. In the known art the outer edge 107a of each side strap 107 substantially terminated close to the corresponding side edge 105a of the first belt strip 105. In contrast, in the embodiments of the present invention the edges of the belt strips 5, 6 and the side straps 7 are consecutively offset in the same direction to achieve the advantage of a greater structural evenness of the whole.

In the tire of FIGS. 1 and 2, the side straps 7 are located at an axially more internal position than in the known art. This fact offers a further unexpected advantage especially in tires of the so-called ribbed type, for steering wheels, provided with continuous circumferential grooves, like those shown at 4a in the accompanying drawings.

It is in fact possible to note (FIG. 3) that the side straps 107 according to the known art had such a positioning that they terminated, at an axially internal position, substantially in correspondence with the axially outermost one 104a of the grooves arranged in the tread band. This condition actually created a hinge point in the crown portion of the tire causing non-negligible inconveniences consisting of localized stresses at the groove bottom which reduced the structural strength of the tread band. This triggered wearings in the blend and breaking in the underlying belt strips. These inconveniences, known as "pavement effect" were particularly augmented when the vehicle wheel went up a relief, generally a pavement, and only the laterally outermost portion of the tire tread, that is the shoulder rib, rested on such a relief. Increasing the width of the side straps 107 for obviating this drawback would have brought about the known and important problems present when the tire is being molded, during the vulcanization step, that is when the belt structure 103 has to be radially extended on coupling of the raw tire with the surface of the mold. In addition, undesired changes in the tire features, such as weight increase and less ride comfort, would have occurred. In the solution proposed by the invention, each side strap 7 is advantageously disposed below said corresponding longitudinal groove 4a, preferably at a centered position, so that the tire is given a greater structural homogeneity and behavioral evenness, without any increase in the axial size of the side straps being required.

In a quite surprising and unforeseeable manner, this axial backing towards the inside of straps 7 with respect to the edges of the underlying belt strips did not give rise to the expected worsening of the wear features of the tread side portions, that is at the shoulder ribs. Although this hypothesis does not represent a constraint or a limitation on the present invention, the cause of the lack of this expected worsening is likely to reside in the fact that the elimination of the above mentioned hinge point has modified the tread band behavior during the tire rolling, thereby enabling the tire wearing to take place in a more even and more regular manner even at critical areas thereof, such as the tread shoulders.

Obviously a person skilled in the art, after understanding the above described invention, will be able to carry out all modifications, changes and replacements of the variable elements associated with the present invention for the purpose of meeting all specific requirements.

What is claimed is:

1. A radial tire for motor vehicles with an improved belt structure, comprising:
    a carcass structure (2) provided with at least one carcass ply (2a) having reinforcing cords oriented substantially in radial planes containing the rotation axis of the tire;
    a tread band (4) extending circumferentially around said carcass structure (2) and provided with a raised tread pattern comprising a plurality of hollows variously disposed with respect to the equatorial plane;
    a belt structure (3) circumferentially interposed between the carcass structure (2) and the tread band (4) and comprising a pair of radially superposed belt strips axially extending substantially as much as said tread band, of which the first belt strip (5) faces the carcass structure (2) and has a plurality of cords oriented obliquely to the equatorial plane (p) of the tire (1), whereas the second belt strip (6) extends circumferentially around said first belt strip (5) and has cords oriented obliquely to said equatorial plane (p) in a direction opposite to the orientation of the cords in the first belt strip (5), and a pair of side straps (7) each of which is disposed adjacent to a respective side edge (6a) of the second belt strip (6) and comprises a plurality of cord coils circumferentially wound on said second belt strip (6) in two radially superposed layers formed of several coils disposed in axial side by side relation,
    the first belt strip (5) facing said carcass structure (2), having a width (L) larger than the width ($L_1$) of the second belt strip (6);
    the second belt strip (6) having side flaps (6b) projecting from the side straps (7), each spaced apart from the first belt strip (5) according to an upper gap (S) of an increasingly growing spacing with distance away from the axially outer side edge (7a) of the adjacent side stray (7).

2. A tire according to claim 1, wherein said spacing of the upper gap (S) is included in a range between 0.5 and 10 mm.

3. A tire according to claim 1, wherein at the end edge (6a) of each side flap (6b) of the second belt strip (6), said spacing of the upper gap (S) in millimeters is calculated according to the relation $$S=y^2 r+k$$

wherein:

k=0.5 mm;

y=axial distance in millimeters existing between said edge (6a) and the outer side edge (7a) of the adjacent side strap (7); and $0 < r \leq 0.1$, k being the minimum distance in millimeters between the cords of the first and second belt strips.

4. A tire according to claim 1, wherein the side flaps (6b) project a maximum axial distance (y) included between 1 mm and 30 mm from the side straps (7).

5. A tire according to claim 1, wherein the first belt strip (5) has side flaps (5b) projecting from the second belt strip (6), the tire further comprising at least one pair of first elastomeric inserts (9) each extending circumferentially between the first belt strip (5) and the second belt strip (6) close to said side flaps (5b, 6b) of the first and second belt strips (5, 6), said first elastomeric inserts (9) determining said upper gap (S) spacing.

6. A tire according to claim 1, wherein the first belt strip (5) has side flaps (5b) projecting from the second belt strip (6) and each spaced apart from the carcass structure (2) by a lower gap ($S_1$) the measure of which increasingly grows axially outwardly.

7. A tire according to claim 6, wherein said spacing of the lower gap ($S_1$) at the end edge (5a) of each side flap (5b) of the first belt strip (5) is in a range between 2 mm and 15 mm.

8. A tire according to claim 6, wherein the side flaps (5b) of the first belt strip (5) project a maximum axial distance ($y_1$) in a range between 5 mm and 20 mm from the second belt strip (6).

9. A tire according to claim 6, wherein the axially inner side edges (7b) of said side straps (7) axially project inwardly with respect to the axially inner leading end (K) of said lower gap ($S_1$) over a portion (b) of a length included between 0% and 30% of the maximum axial extension (L) of the belt structure (3).

* * * * *